United States Patent [19]

Rana et al.

[11] Patent Number: 5,764,970
[45] Date of Patent: Jun. 9, 1998

[54] METHOD AND APPARATUS FOR SUPPORTING SPECULATIVE BRANCH AND LINK/BRANCH ON COUNT INSTRUCTIONS

[75] Inventors: Deepak Rana, Bethlehem, Pa.; David A. Schroter, Round Rock, Tex.

[73] Assignee: International Business Machines Corporation, Armonk, N.Y.

[21] Appl. No.: 560,614

[22] Filed: Nov. 20, 1995

[51] Int. Cl.$^6$ ........................................................ G06F 9/40
[52] U.S. Cl. ........................................................ 395/580
[58] Field of Search ................................. 395/376, 800, 395/377, 391, 392, 580

[56] References Cited

U.S. PATENT DOCUMENTS

| | | |
|---|---|---|
| 4,394,733 | 7/1983 | Swenson . |
| 4,413,317 | 11/1983 | Swenson . |
| 4,425,615 | 1/1984 | Swenson et al. . |
| 4,764,861 | 8/1988 | Shibuya . |
| 4,937,783 | 6/1990 | Lee . |
| 5,276,882 | 1/1994 | Emma et al. . |
| 5,285,376 | 2/1994 | Struger et al. . |
| 5,303,356 | 4/1994 | Vassilladis et al. ............. 395/375 |
| 5,367,703 | 11/1994 | Levitan . |
| 5,421,020 | 5/1995 | Levitan . |
| 5,448,746 | 9/1995 | Eickemeyer et al. ............. 395/800 |
| 5,491,829 | 2/1996 | Kan et al. ............. 395/800 |
| 5,499,204 | 3/1996 | Barrera et al. ............. 365/49 |
| 5,655,141 | 8/1997 | Ogden et al. ............. 395/800.23 |

FOREIGN PATENT DOCUMENTS

| | | |
|---|---|---|
| 0 605 872 A1 | 7/1994 | European Pat. Off. . |
| 1-180638 | 7/1989 | Japan . |

OTHER PUBLICATIONS

"Metaparallelism–Branch Prediction . . . ," IBM Technical Disclosure Bulletin, vol. 36, No. 09A, Sep. 1993, pp. 55–58.
"RISC Superscalar Pipeline . . . ," IBM Technical Disclosure Bulletin, vol. 37, No. 04B, Apr. 1994, pp. 385–388.
"Metaparallel Processor," IBM Technical Disclosure Bulletin, vol. 36, No. 09A, Sep. 1993, pp. 411–416.

"Metaparallelism–Bayesian Branch . . . " IBM Disclosure Technical Bulletin, vol. 36, No. 03, Mar. 1993, pp. 253–254.

"Fixed–Point/Floating–Point . . . " IBM Technical Disclosure Bulletin, vol. 35, No. 1B, Jun. 1992, pp. 398–399.

English language summary of Japanese Patent No. 1-180638 submitted herewith.

*Primary Examiner*—David Y. Eng
*Attorney, Agent, or Firm*—Anthony V. S. England; Brian F. Russell; Andrew J. Dillon

[57] ABSTRACT

A method and apparatus for supporting speculative execution of count and link register modifying instructions in a microprocessor is provided. The apparatus includes a queue of rename buffers storing count/link register operand data resulting from speculatively executed instructions that modify a count/link register. The queue contains a set of control buffers, wherein each control buffer contains control bits associated with a rename buffer, the control bits including an instruction identifier tag identifying a speculatively executed instruction, the operand data of the speculatively executed instruction being stored in the associated rename buffer, and an available bit indicating when the operand data no longer needs to be stored in the associated rename buffer. The apparatus control logic sets the control bits for each control buffer, including setting the instruction identifier tag to the value indicated by a dispatch unit, and selectively sets or resets the available bit based on resolution of the speculatively executed instruction.

22 Claims, 4 Drawing Sheets

METHOD AND APPARATUS FOR SUPPORTING SPECULATIVE BRANCH AND LINK/BRANCH ON COUNT INSTRUCTIONS

BACKGROUND OF THE INVENTION

1. Technical Field

The present invention relates in general to a method and apparatus for supporting speculative execution of instructions in a superscalar microprocessor, and in particular to a method and apparatus for supporting speculative execution of branch and link/branch on count instructions in a superscalar microprocessor.

2. Description of the Related Art

In modern microprocessors, it is advantageous to support speculative execution of instructions using branch prediction mechanisms, out-of-order execution, and multiple pipelines. While advance execution of instructions provides substantial enhancement of performance, a method is required to recover the architected state of the machine, as seen by the computer program, when the speculative path of instructions as taken by branch predictions is mispredicted from the actual program sequence, or when precise interrupts occur prior to the speculatively executed instructions, for example. In such a speculative execution scheme, permitting multiple branch and link (BAL) and branch on count (BCT) speculative paths to be executed presents the problem of how to restore the architected state of the link register and/or the count register when the speculative path is found to have resulted from a mispredicted branch, while minimizing the performance penalty of the restoration process. Because of the complexity involved in restoring the system to the architected state when multiple branch and link or branch on count instructions are in one or more speculative paths that are mispredicted or are subject to precise interrupts, microprocessors in the prior art have not heretofore allowed more than one branch and link or branch on count instruction to be speculatively executed. What is needed is a mechanism for supporting speculative execution in a microprocessor of multiple register-modifying instructions such as the BAL and BCT.

SUMMARY OF THE INVENTION

A method and apparatus for supporting speculative execution of count and link register modifying instructions in a microprocessor is provided. The apparatus includes a queue of rename buffers storing count/link register operand data resulting from speculatively executed instructions that modify a count/link register. The queue contains a set of control buffers, wherein each control buffer contains control bits associated with a rename buffer, the control bits including an instruction identifier tag identifying a speculatively executed instruction, the operand data of the speculatively executed instruction being stored in the associated rename buffer, and an available bit indicating when the operand data no longer needs to be stored in the associated rename buffer. The apparatus control logic sets the control bits for each control buffer, including setting the instruction identifier tag to the value indicated by a dispatch unit, and selectively sets or resets the available bit based on resolution of the speculatively executed instruction. The invention is further disclosed in a method comprising the steps of creating a count/link register table that contains a plurality of entries, wherein each entry is associated with a rename buffer and includes an available bit and a load bit; associating an instruction identifier with a speculative instruction that modifies the count/link register and that has been dispatched to an execution unit for execution; setting an entry of the plurality of entries in the count/link register table, wherein the entry is set to include the instruction identifier associated with the speculative instruction and the available bit is reset to indicate the entry is allocated to the speculative instruction associated with the instruction identifier; storing the resulting data from the speculative instruction in the rename buffer associated with the set entry, when the speculative instruction finishes execution; and setting the load bit in the set entry to indicate that the results of the speculative instruction identified by the instruction identifier are stored in the rename buffer associated with the set entry.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
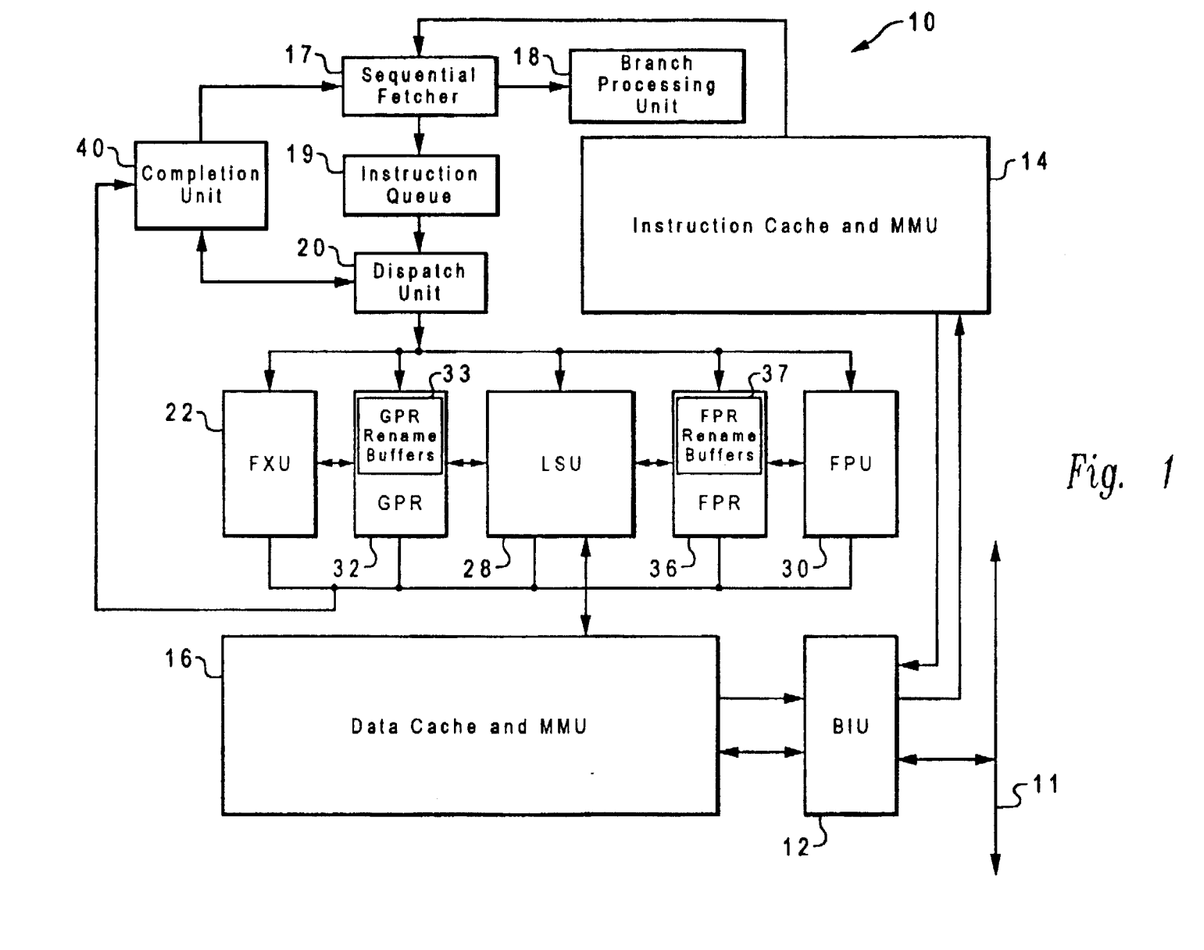
FIG. 1 illustrates a block diagram of a processor for processing information according to a preferred embodiment of the present invention

With reference now to the figures and in particular with reference to FIG. 1, there is illustrated a block diagram of a processor, indicated generally at 10, for processing information according to a preferred embodiment of the present invention. In the depicted embodiment, processor 10 comprises a single integrated circuit superscalar microprocessor capable of executing multiple instructions per processor cycle. Accordingly, as discussed further below, processor 10 includes various execution units, registers, buffers, memories, and other functional units, which are all formed by integrated circuitry. In a preferred embodiment of the present invention, processor 10 comprises one of the PowerPC™ line of microprocessors produced by International Business Machines, Inc., which operates according to reduced instruction set computing (RISC) techniques.

As depicted in FIG. 1, processor 10 is coupled to system bus 11 via a bus interface unit (BIU) 12 within processor 10. BIU 12 controls the transfer of information between processor 10 and other devices coupled to system bus 11, such as a main memory (not illustrated). Processor 10, system bus 11, and the other devices coupled to system bus 11 together form a host data processing system. BIU 12 is connected to instruction cache 14 and data cache 16 within processor 10. High speed caches, such as instruction cache 14 and data cache 16, enable processor 10 to achieve relatively fast access time to a subset of data or instructions previously transferred from main memory to the high speed caches, thus improving the speed of operation of the host data processing system. Instruction cache 14 is further coupled to sequential fetcher 17, which fetches instructions from instruction cache 14 for execution.

Sequential fetcher 17 transfers branch instructions to branch processing unit (BPU) 18 for execution, and transfers sequential instructions to instruction queue 19 for temporary storage before being executed by other execution circuitry within processor 10. BPU 18 executes branch instructions, which change the sequence in which the instructions in the computer program are performed, and performs static and dynamic branch prediction on unresolved conditional branches to allow speculative instructions to be fetched and executed. Instructions issued beyond a predicted branch do not complete execution until the branch is resolved, preserving the programming model of sequential execution. Sequential instructions are transferred from instruction queue 19 to dispatch unit 20 to be dispatched to their respective execution units-the dispatch rate being contingent upon execution unit busy status, rename and completion buffer availability, and the serializing behavior of some instructions. Dispatch unit 20 performs source and destination register dependency checking and renaming on instructions dispatched in parallel or out-of-order.

In the depicted embodiment, in addition to BPU 18, the execution circuitry of processor 10 comprises multiple execution units, including fixed-point unit (FXU) 22, load/store unit (LSU) 28, and floating-point unit (FPU) 30. As is well-known to those skilled in the computer art, each of execution units 18, 22, 28, and 30 can execute one or more instructions within a particular class of sequential instructions during each processor cycle. For example, FXU 22 performs fixed-point mathematical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 performs floating-point operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. LSU 28 executes floating-point and fixed-point instructions that either load data from memory (i.e., either data cache 16 or main memory) into selected GPRs 32 or FPRs 36, or that store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. As is typical of high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. Sequential instructions fetched from instruction cache 14 are stored by sequential fetcher 17 within instruction queue 19. Fetched branch instructions are removed from the instruction stream and are forwarded to BPU 18 for execution. BPU 18 includes a branch prediction mechanism, such as a branch history table, that enables BPU 18 to speculatively execute unresolved conditional branch instructions by predicting whether the branch will be taken.

During the decode/dispatch stage, dispatch unit 20 decodes and dispatches one or more instructions from instruction queue 19 to the appropriate ones of execution units 22, 28, and 30. Also during the decode/dispatch stage, dispatch unit 20 allocates a rename buffer within GPR rename buffers 33 or FPR rename buffers 37 for each dispatched instruction's result data. According to a preferred embodiment of the present invention, processor 10 dispatches instructions in program order and tracks the program order of the dispatched instructions during out-of-order execution utilizing unique instruction identifiers. In addition to an instruction identifier, each instruction within the execution pipeline of processor 10 has an rA tag and a rB tag, which indicate the sources of the A and B operands for the instruction, and a rD tag that indicates a destination rename buffer within GPR rename buffers 33 or FPR rename buffers 37 for the result data of the instruction.

During the execute stage, execution units 22, 28, and 30, execute instructions received from dispatch unit 20 opportunistically as operands and execution resources for the indicated operations are available. After execution has finished, execution units 22, 28, and 30 store result data within either GPR rename buffers 33 or FPR rename buffers 37, depending upon the instruction type. Then, execution units 22, 28, and 30 notify completion unit 40 which instructions have finished execution. Finally, instructions are completed by completion unit 40 in program order by transferring result data from GPR rename buffers 33 and FPR rename buffers 37 to GPRs 32 and FPRs 36, respectively.

BPU 18 contains an adder to compute branch target addresses, and three architected registers-the link register (LR), the count register (CTR), and the condition register (CR). There are a number of branch instructions which modify the link or count registers, the most common being the Branch And Link and Branch On Count instructions. The Branch On Count instruction is a conditional branch instruction. The count register holds both the branch target address and a count. The Branch On Count instruction specifies an action on the count (either decrementing it or leaving it alone) and a test on the resulting count (either it is 0 or it is not 0). The branch to the branch target address is taken when the appropriate condition is met. In addition, BPU 18 calculates the return pointer for subroutine calls and saves it in the link register for certain types of branch instructions, such as the Branch And Link instruction. For example, the Branch And Link instruction conditionally branches to the address specified in the link register and then the instruction address following the branch instruction is placed into the link register. The Branch Conditional to Count Register Then Link instruction conditionally branches to the address specified in the count register and then the instruction address following the branch instruction is placed into the link register. An unconditional branch or a conditional branch instruction may also indicate that the instruction address following the branch instruction is to be placed into the link register. Still further, there are Move To/From Special Register instructions that enable data to be transferred to and from the link and count register. In particular, the contents of the link register and the count register can be copied to or from any general purpose register using the move-to-link-register (MTLR) and the move-to-count-register (MTCR) instructions, which directly load data into the link and count registers, respectively.

Figure 2:
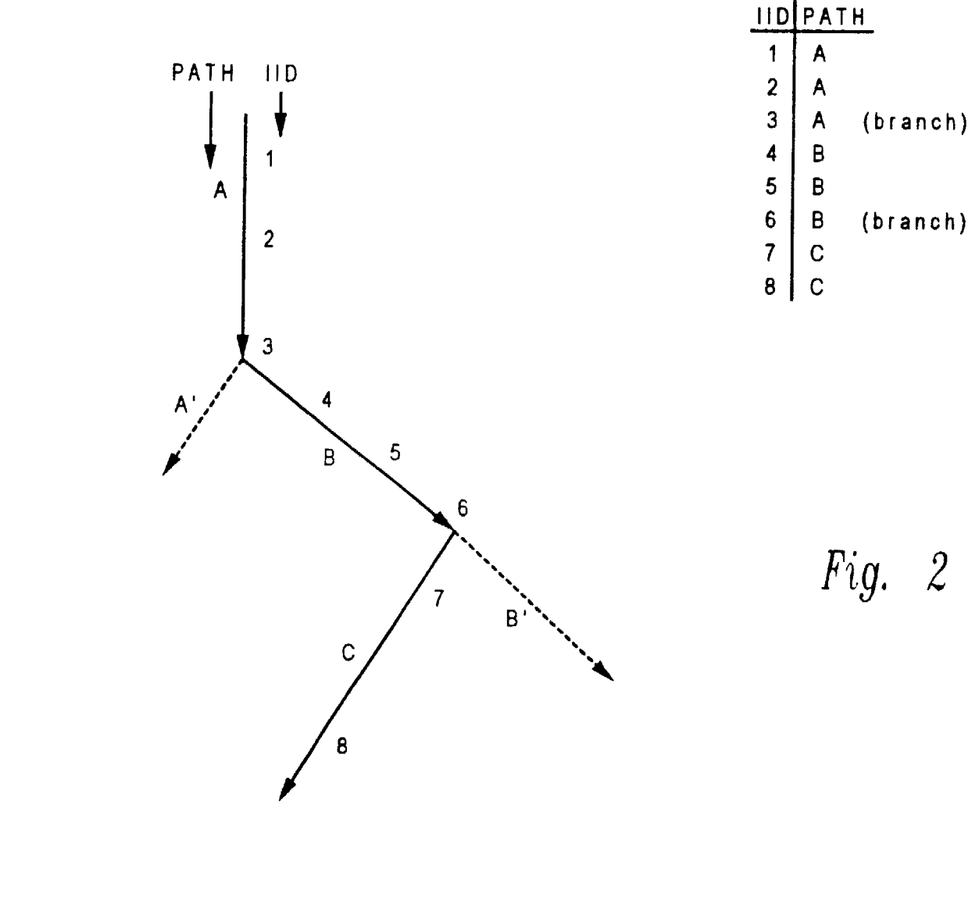
FIG. 2 shows an example of a speculative instruction path for the microprocessor of the present invention.

Referring now to FIG. 2, there is shown an example of a speculative instruction path for the microprocessor of the present invention. Upon dispatch from the dispatch unit, instructions are assigned an instruction identifier (IID) that is maintained in association with the issued instruction until it is completed. As seen in FIG. 2, eight speculative instructions have been issued having IIDs 1–8. Instruction 3 and instruction 6 are branch instructions that modify the link or count registers. Each instruction 1–8 belongs to a speculative instruction path in the instruction stream executed by the microprocessor. Instructions 1–3 lie within speculative instruction path A. Instruction 3 is a branch instruction, such as a Branch On Count instruction, which branches the instruction stream into speculative path B. If the branch had not been taken—for example, if the count condition had not been reached—the instruction sequence would continue along instruction path A to the subsequent instructions in leg A' of path A. Instructions 4–6 comprise speculative instruction path B. Instruction 6 is a branch instruction, such as a branch and link that branch the instruction sequence to speculative instruction path C. Speculative instruction path C includes instructions 7 and 8. If the branch at instruction 6 had not been taken, the instruction sequence would continue along speculative instruction path B to execute subsequent instructions in leg B' of speculative path B.

Figure 3:
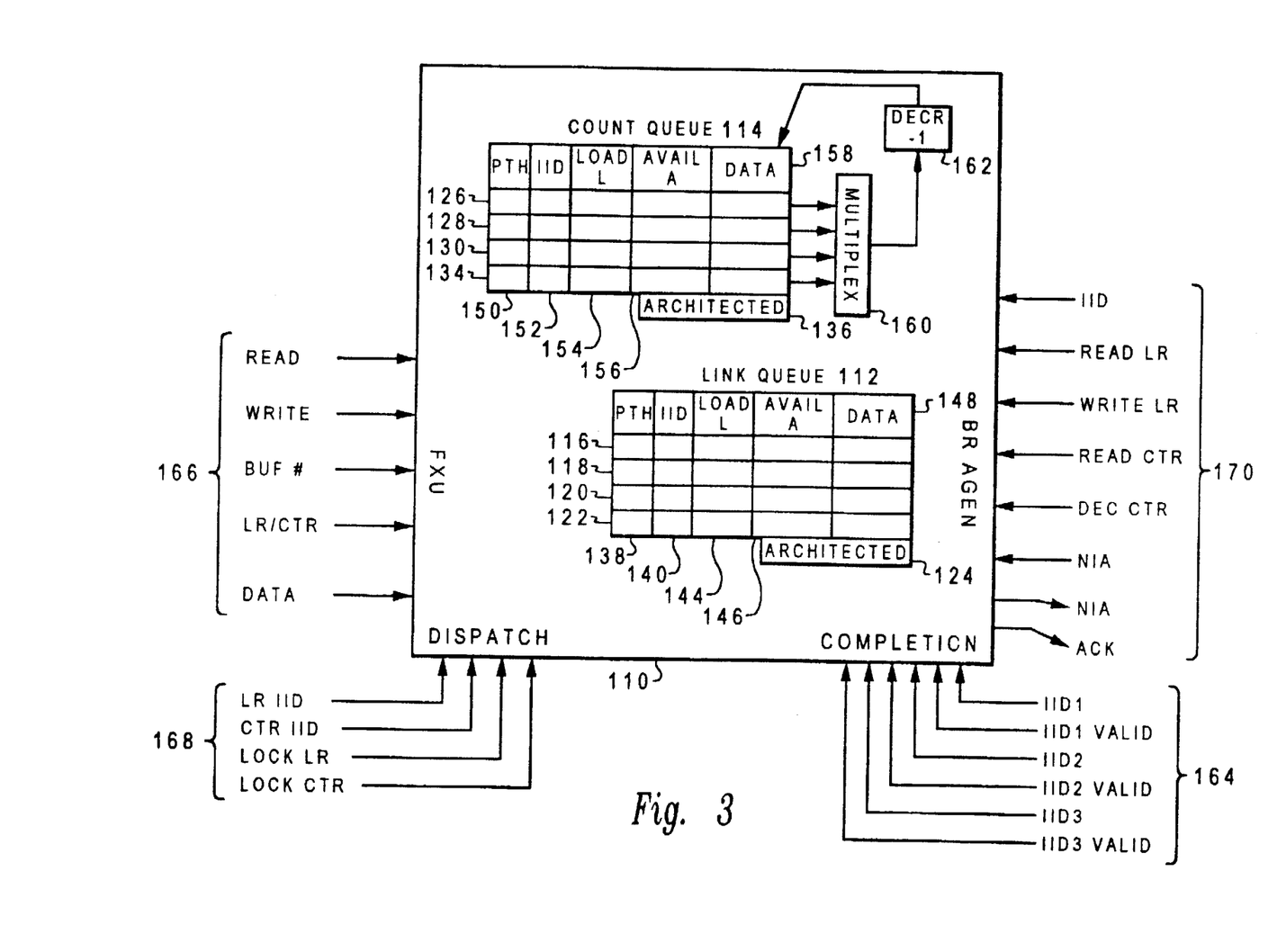
FIG. 3 shows a branch/link register processing unit having a link register queue and a count register queue, in accordance with the preferred embodiment of the present invention.

Referring now to FIG. 3, there is shown a branch/link register processing unit having a link register queue and a count register queue, in accordance with the preferred embodiment of the present invention. The link/count register processing unit 110 contains a link queue 112 and a count queue 114. The link register and count register queues are first-in-first-out (FIFO) queues comprised of five buffers—four rename buffers and one architected buffer. The link queue 112 contains four link rename buffers 116–122 and an architected link register 124. Count queue 114 contains four count rename buffers 126–134 and an architected count register 136. A single completion buffer is allocated for each instruction once it enters dispatch unit 20. An available completion buffer is a required resource for instruction dispatch; therefore, a maximum of five instructions may be dispatched at a time. Consequently, only four rename buffers are required for each of the link and count registers. Both link queue 112 and count queue 114 operate in an identical manner, and so while only the operation of the link queue will be described in detail, it will be understood that count queue 114 operates in an identical manner.

In accordance with the present invention, if a dispatched speculative instruction modifies the link register (or the count register in the case of the count queue), an entry in the link queue 112 is allocated for the dispatched instruction. In other words, when speculatively executing a link register modifying instruction, a link rename buffer is associated to the instruction upon its dispatch. Link queue 112 contains four entries or rename buffers 116–122. Each entry has five fields: a path, an instruction identifier, a load bit, an available bit, and a data field. Upon dispatch, the instruction is identified as being contained within a speculative instruction path. In addition, an instruction identifier is associated with the dispatched instruction. The path and instruction identifier for the link register modifying instruction are both loaded into their allocated fields of the link queue 112—the path field 138 and instruction identifier (IID) field 140, respectively. Also, the available bit (A) 146 (or invalidate bit) of the entry is reset to indicate that the rename buffer has been allocated to an executing instruction. When the link register modifying instruction finishes execution, the resulting data is loaded into the associated rename buffer, for example link register rename buffer 116, in data field 148. Upon loading the result data in data field 148, the load bit (L) 144 is set to indicate that the data resulting from the link register modifying instruction identified by IID 140 is now stored in the rename buffer. When the instruction associated with one of the link rename buffers 116–122 completes, its data from data field 148 is transferred to architected link register 124, thereby commiting the data to the architected state of the system.

The speculative execution of link/count modifying instructions can be illustrated by the execution of a Branch and Link and a Branch On Count instruction, in a preferred embodiment of the present invention. As an example, the Branch and Link instruction is instruction 3 of branch path A and the Branch On Count instruction is instruction 6 on the instruction path B of FIG. 2. The Branch and Link instruction 3 will be executed by branch processing unit 18. The branch prediction mechanism of branch processing unit 18 will predict path B. The hardware will thus prefetch the branch-target instructions—instructions 4, 5, and 6—to be loaded into instruction queue 19, for later dispatch. Also at the execution of the branch instruction, the effective address of the instruction following the branch instruction is placed in the link register to allow the branch to return to the original instruction sequence after its execution. Also, branch processing unit 18 allocates a rename buffer 116–122 in the link queue 112 to this Branch and Link instruction. The available bit (A) 146 for each entry is queried to determine which buffer is available for loading of new result data. The selected rename buffer, for example link rename buffer 116, has its available bit 146 reset, the path identifier 138 is set to path A (the branch instruction is within path A), and the instruction ID 140 is set to instruction 3. The effective address of the instruction following the branch instruction is loaded into data field 148 and the loaded bit 144 is set. When the Branch and Link instruction completes, the link register data in data field 148 is transferred to the architected link register 124 and the available bit 146 for rename buffer 116 is set to indicate that this rename buffer is again available for renaming link register modifying instructions. Once loaded in a rename buffer, the link/count register data in the rename buffer field 148, 158 may be utilized by an execution unit executing a link/count register dependent instruction to resolve the data dependency. A register data dependent instruction is one that relies upon valid register data from a previous instruction for its execution.

Upon the dispatch of Branch On Count instruction 6 in speculative path B, one of the count register rename buffers 126–134 is allocated to the branch instruction. Only a count rename buffer having a set available bit 156 is allocated to the Branch On Count instruction. Once the buffer is associated with the instruction, the available bit 156 for the selected count register rename buffer, count rename buffer 126 for example, is reset, the path identifier 150 is set to speculative instruction path B, and the instruction ID 152 is set to instruction 6. Upon dispatch of the instruction, the count register data is loaded into data field 158 and the loaded bit 154 is set. As will be appreciated by those skilled in the art, multiplexer 160 allows selection of the appropriate count rename buffer 126–134 for decrementing the count data 158 by decrementor 162.

Upon completion of the Branch On Count instruction, completion unit 40 will transmit via signals 164 the instruction ID of the Branch On Count instruction, in this case instruction 6, and will set the "valid" bit to indicate that this instruction has completed. For example, in FIG. 3, IID1 would indicate instruction 6, and the IID1 VALID signal would be set to indicate this instruction has completed. These signals would cause the count register data 158 of the associated entry 126 to be transferred to the architected register 136, and the available bit 156 of rename buffer 126 to be set, indicating that this buffer is now available for a new renamed instruction.

Also shown in FIG. 3 are signals 170, used to access the count and link registers for address generation, as will be understood by those skilled in the art. The signals 168 are received from dispatch unit 20 to set the instruction identifier for count/link modifying instructions, and in embodiments where the speculative result data 148, 158 are held in separate rename buffers from the link and count rename tables, such as in GPR rename buffers 33, dispatch unit 20 uses signals 168 to set the loaded bit of an entry when its associated rename buffer has been loaded.

As a further example, instruction 7 may be a MTCR instruction that retrieves the count register data from the FXU 22. As seen in FIG. 3, it will be appreciated that signals 166 are used to read and write data from the FXU 22. In the example, count register rename buffer 128 is allocated to the move-to-count instruction. The available bit 156 is reset, the path identifier 150 is set to path C, and the instruction ID 152 is set to instruction 7 in count register rename buffer 128. The load bit 154 would not be set because the data 158 is not loaded from the FXU until subsequent instruction. Upon the loading of the data 158 by FXU 22, the loaded bit 154 is set.

In an important aspect of the present invention, if a speculative branch has been mispredicted, the rename queue entries are easily cancelled. For example, it may be resolved that branch path B in FIG. 2 is mispredicted. Therefore, the entries associated with branch path B and C are deallocated in the queues by marking the available bits 146, 156, for each entry of the rename queues having a path identifier 138, 150 set to branch path B or C. As a result of resolving the branch, the path is restored to branch A (IID=3) and IIDs following the path (IID=4-7) are marked available, thereby suppressing the speculative results of instructions in branch paths B and C. The instructions in branch A' are selected as the current path and IIDs are assigned starting with IID=4 to that current path. All the instructions in path A may not have been completed at the time that this branch is resolved. Therefore, their speculative entries remain valid in the queue until completed and placed in the architected register.

As can be seen, the technique of having a path identifier to mark speculative branch paths permits an easy method of cancelling groups of entries at once when their instructions are determined to be mispredicted. As will be appreciated by those skilled in the art, alternative methods of cancelling groups of entries may be employed with the present invention. For example, the path identifier may be a pair of vectors pointing to the range of valid IIDs that lay within a given path. When that path is to be cancelled, all entries having an instruction identifier falling within the cancelled vector are cancelled from a queue.

Figure 4:
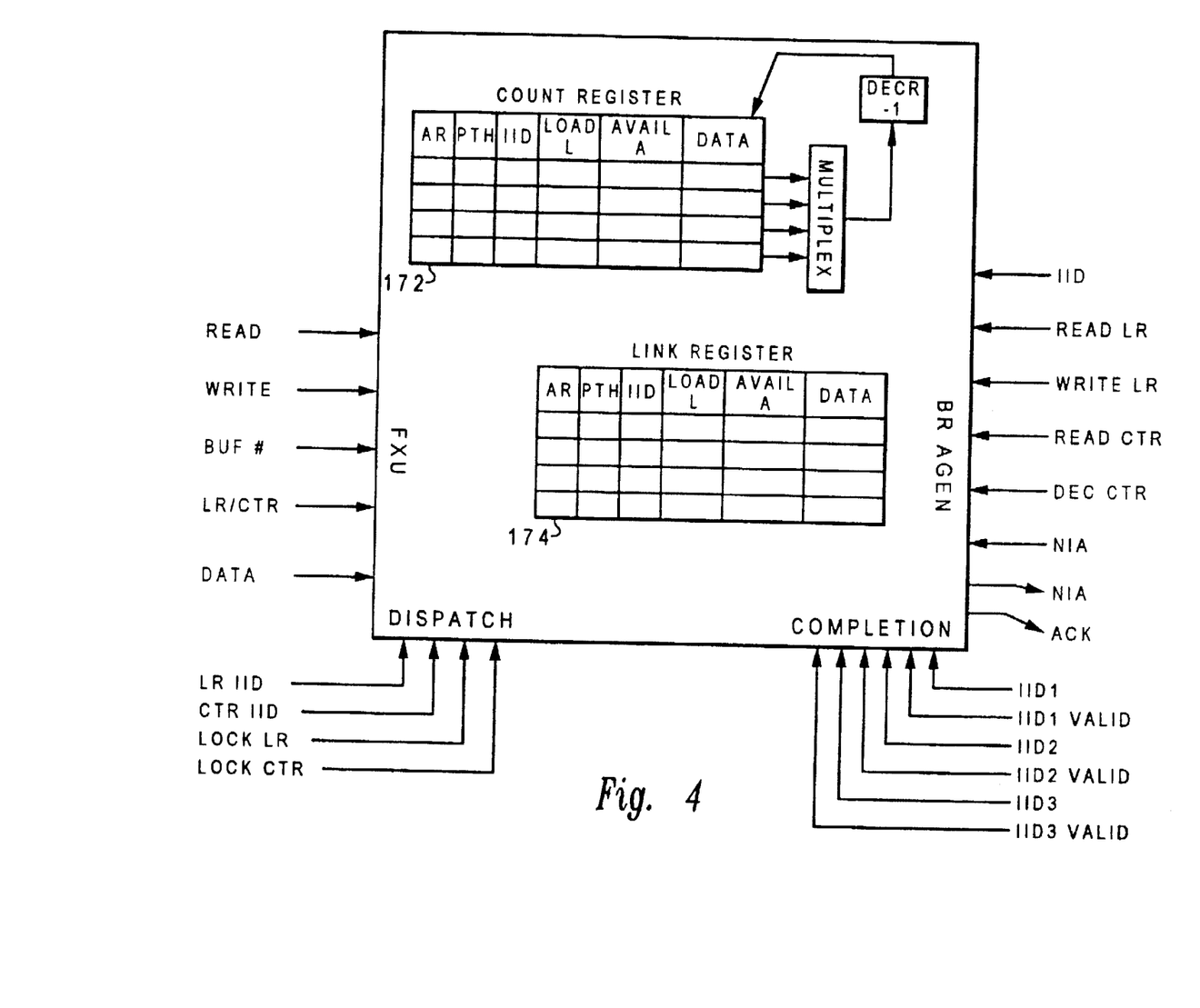
FIG. 4 shows a branch/link register processing unit having a link register queue and a count register queue, in accordance with an alternative preferred embodiment of the present invention.

Referring now to FIG. 4, there is shown a branch/link register processing unit having a link register queue and a count register queue, in accordance with an alternative preferred embodiment of the present invention. In an alternative preferred embodiment of the present invention, the count/link queue additionally contains an architected register bit 172, 174 that sets a marked rename buffer as the architected register for the system. As shown in FIG. 4, the count and link queues operate as described above, however, each entry in the rename queues contain an architected register bit (AR) 172, 174. A set architected register bit indicates that the associated rename buffer is currently to be utilized by the system as the architected register. Only one entry in the queue can have the architected bit set at a given time. All other entries in the respective queues are available for use by speculative instruction's. When the instruction associated with an entry completes its execution, its architected register bit 172 is set and the architected register bit for all other entries is reset.

As will be appreciated by those skilled in the art, although the preferred embodiment has been described as including data fields 148, 158 in rename queues 112, 114, rename buffers separate from those used to store the queue entries may be utilized to store the result operand data of the speculative register modifying instructions. In this embodiment, each entry of the rename table is comprised of the path identifier 138, 150, instruction identifier 140, 152, loaded bit 144, 154, and available bit 146, 156. Each queue entry has a pointer associating it with a particular rename register 148, 158 containing the result operand data of the instruction.

While the invention has been particularly shown and described with reference to a preferred embodiment, it will be understood by those skilled in the art that various changes in form and detail may be made therein without departing from the spirit and scope of the invention.

What is claimed is:

1. An apparatus for supporting speculative execution of count register modifying instructions in a processor, said apparatus comprising:

a set of rename buffers storing count register operand data resulting from speculatively executed instructions that modify or read from a count register;

a set of control buffers, wherein each control buffer contains control bits associated with a rename buffer, the control bits including an instruction identifier tag identifying, by relative position in program sequence, a speculatively executed instruction storing operand data in the associated rename buffer and an available bit indicating when the operand data no longer needs to be stored in the associated rename buffer; and control logic that sets the control bits for each control buffer, wherein said control logic sets the instruction identifier tag to a value indicated by a dispatch unit and selectively sets or resets the available bit based on resolution of a speculative execution path containing the speculatively executed instruction as mispredicted or correctly predicted.

2. An apparatus according to claim 1, wherein the control bits include an architected bit that indicates if the associated rename buffer is dedicated as the architected count register.

3. An apparatus according to claim 1, and further comprising an architected count register, wherein operand data stored in a rename buffer identified by the instruction identifier of a speculatively executed instruction that has completed is transferred from the rename buffer to the architected register.

4. An apparatus according to claim 1, wherein the available bit indicates when the associated rename buffer is available to be loaded with new operand data and the instruction identifier tag may be reset to identify a new speculatively executed instruction.

5. An apparatus according to claim 1, wherein the control bits include a path identifier that indicates the speculative path containing the speculatively executed instruction associated with the instruction identifier.

6. A method of supporting speculative execution of count register modifying instructions in a processor, said processor including an execution unit and a count register table that contains a plurality of entries, wherein each entry is associated with a rename buffer and includes an available bit and a load bit the method comprising the steps of:

associating an instruction identifier with a speculative instruction that modifies the count register and that has been dispatched to an execution unit for execution;

setting an entry among the plurality of entries in the count register table, said setting step including the step of specifying, in the entry, the instruction identifier associated with the speculative instruction and resetting the available bit to indicate the entry is allocated to the speculative instruction associated with the instruction identifier;

in response to execution of the speculative instruction, storing data resulting from execution of the speculative instruction in the rename buffer associated with the entry; and setting the load bit in the entry to indicate that the data resulting from execution of the speculative instruction identified by the instruction identifier are stored in the rename buffer associated with the entry.

7. A method according to claim 6, said method further comprising the step of setting the available bit for the entry in response to resolving the speculative path containing the speculative instruction as mispredicted.

8. A method according to claim 6, wherein each non-available entry among the plurality of entries further includes a path identifier that indicates which speculative path contains the associated speculative instruction, and wherein when a particular speculative path has been resolved as mispredicted, the available bit of every entry having a path identifier indicating said particular speculative path is set.

9. A method according to claim 6, wherein an entry in the count register table is created by overwriting an entry having a set available bit.

10. A method according to claim 6, wherein each entry further comprises an architected bit that indicates if the associated rename buffer is dedicated as the architected count register, and further comprising the step of setting the architected bit of an entry having the instruction identifier of a speculative instruction that has completed.

11. A method according to claim 6, further comprising the step of transferring the data stored in the associated rename buffer of an entry having the instruction identifier of a speculative instruction that has completed to an architected register.

12. An apparatus for supporting speculative execution of link register modifying instructions in a processor, said apparatus comprising:

a set of rename buffers storing link register operand data resulting from speculatively executed instructions that modify a link register;

a set of control buffers, wherein each control buffer contains control bits associated with a rename buffer, the control bits including an instruction identifier tag identifying, by relative position in program sequence, a speculatively executed instruction storing operand data in the associated rename buffer and an available bit indicating when the operand data no longer needs to be stored in the associated rename buffer; and control logic that sets the control bits for each control buffer, wherein said control logic sets the instruction identifier tag to the value indicated by a dispatch unit and selectively sets or resets the available bit based on resolution of a speculative execution path containing the speculatively executed instruction as mispredicted or correctly predicted.

13. An apparatus according to claim 12, wherein the control bits include an architected bit that indicates if the associated rename buffer is dedicated as the architected link register.

14. An apparatus according to claim 12, and further comprising an architected link register, wherein operand data stored in a rename buffer identified by the instruction identifier of a speculatively executed instruction that has completed is transferred from the rename buffer to the architected register.

15. An apparatus according to claim 12, wherein the available bit indicates when the associated rename buffer is available to be loaded with new operand data and the instruction identifier tag may be reset to identify a new speculatively executed instruction.

16. An apparatus according to claim 12, wherein the control bits include a path identifier that indicates the speculative path containing the speculatively executed instruction associated with the instruction identifier.

17. A method of supporting speculative execution of link register modifying instructions in a processor, said processor including an execution unit and a link register table that contains a plurality of entries, wherein each entry is associated with a rename buffer and includes an available bit and a load bit, the method comprising the steps of:

associating an instruction identifier with a speculative instruction that modifies the link register and that has been dispatched to an execution unit for execution;

setting an entry among the plurality of entries in the link register table, said setting step including the step of specifying, in the entry, the instruction identifier associated with the speculative instruction and resetting the available bit to indicate the entry is allocated to the speculative instruction associated with the instruction identifier;

in response to execution of the speculative instruction, storing data resulting from execution of the speculative instruction in the rename buffer associated with the entry; and setting the load bit in the entry to indicate that the data resulting from execution of the speculative instruction identified by the instruction identifier are stored in the rename buffer associated with the entry.

18. A method according to claim 17, said method further comprising the step of setting the available bit for the entry in response to resolving the speculative path containing the speculative instruction as mispredicted.

19. A method according to claim 17, wherein each non-available entry among the plurality of entries further includes a path identifier that indicates which speculative path contains the associated speculative instruction, and wherein when a particular speculative path has been resolved as mispredicted, the available bit of every entry having a path identifier indicating said particular speculative path is set.

20. A method according to claim 17, wherein an entry in the link register table is created by overwriting an entry having a set available bit.

21. A method according to claim 17, wherein each entry further comprises an architected bit that indicates if the associated rename buffer is dedicated as the architected link register, and further comprising the step of setting the architected bit of an entry having the instruction identifier of a speculative instruction that has completed.

22. A method according to claim 17, further comprising the step of transferring the data stored in the associated rename buffer of an entry having the instruction identifier of a speculative instruction that has completed to an architected register.

* * * * *